(12) United States Patent
Hurford

(10) Patent No.: US 6,237,797 B1
(45) Date of Patent: May 29, 2001

(54) FUEL CAP EXTENSION

(76) Inventor: John J. Hurford, 4716 Canterbury St., Westlake Village, CA (US) 91362

( * ) Notice: Subject to any disclaimer, the term of this patent is extended or adjusted under 35 U.S.C. 154(b) by 0 days.

(21) Appl. No.: 09/429,015

(22) Filed: Oct. 29, 1999

(51) Int. Cl.[7] ............................... B65D 25/28; B67B 7/14
(52) U.S. Cl. .................. 220/212.5; 220/694; 220/759; 81/3.4; 81/124.2; 81/177.5; 81/177.6; 81/119
(58) Field of Search ................................ 220/212.5, 288, 220/694, 86.2, 752, 755, 757, 759, 768, DIG. 33; 215/228, 295, 302, 303, 305; 81/3.09, 3.4, 176.1, 119, 124.2, 177.5, 177.6, 177.7, 121.1; D8/14, 21, 27; 16/430, 429, 422, 441, 110.1, 411, 425, 426, 427, DIG. 12, DIG. 30; 150/155; 74/551.9

(56) References Cited

U.S. PATENT DOCUMENTS

| | | | |
|---|---|---|---|
| D. 387,255 | * 12/1997 | Rhoton | D8/21 |
| 2,094,567 | * 9/1937 | Barnby | 215/302 |
| 2,120,603 | * 6/1938 | Dreucci | 215/305 |
| 2,308,217 | * 1/1943 | Swanson | 215/305 |
| 3,037,408 | * 6/1962 | Rives et al. | 81/3.09 |
| 3,186,263 | * 6/1965 | Grote | 81/3.09 |
| 3,481,227 | * 12/1969 | Shock | 81/3.09 |
| 3,625,386 | * 12/1971 | Schaefer | 215/305 |
| 4,846,025 | * 7/1989 | Keller et al. | 81/3.09 |
| 5,699,701 | * 12/1997 | Cotton, Jr. | 81/177.5 X |
| 5,896,785 | * 4/1999 | Shaw et al. | 81/3.09 X |

* cited by examiner

*Primary Examiner*—Nathan J. Newhouse

(57) ABSTRACT

An extension for use on a cap and especially adapted for use on a vehicle gas cap which has an elongate member dimensioned so as to extend substantially diametrically across the cap. The base member has upper and lower surfaces, and a pair of side edges. A pair of depending side walls extend downwardly from each side edge of the base member. Together, the base member and side walls define a channel which receives and grips a portion of the cap. Securing means can be provided on the cap extension for securing it to the gas cap.

4 Claims, 2 Drawing Sheets

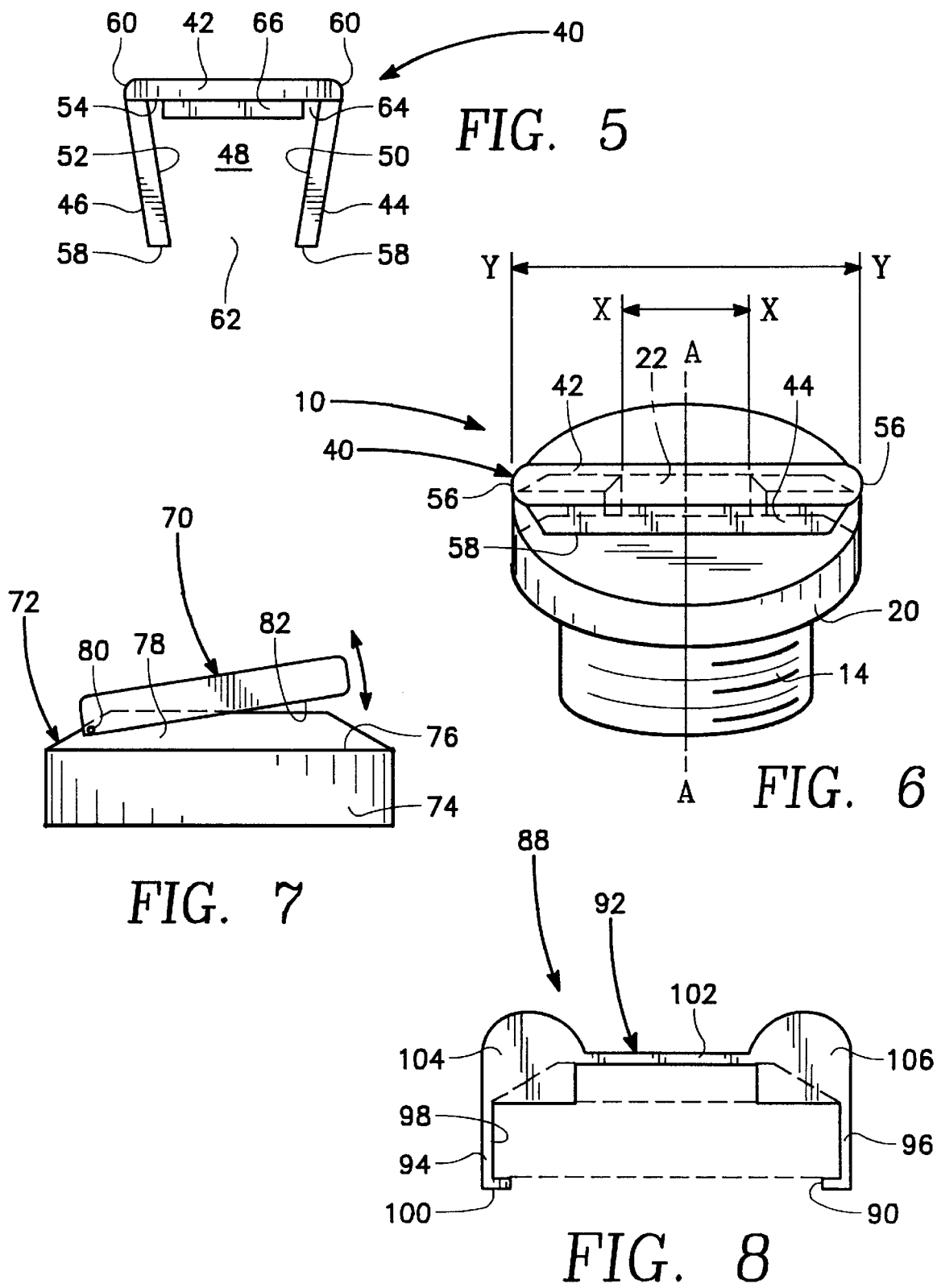

FUEL CAP EXTENSION

FIELD AND BACKGROUND OF THE INVENTION

This invention relates to fuel cap extensions for fuel caps on motor and other vehicles.

Conventionally, motor vehicles include a fuel tank providing a reservoir of fuel for the engine of the vehicle, and the fuel tank attaches to a filling pipe extending from the fuel tank to a convenient location easily accessible on the outside of the vehicle. Often, many vehicles have such a fuel tank filling pipe which terminates at or near the rear fender of the vehicle. The filling pipe terminates, in many vehicles, in a recessed compartment on the outside of the vehicle, the compartment being closed off by a fuel door mounted on a hinge, which can open and close to provide access to the end of the filling pipe. Within the compartment or recess, the filling pipe is closed by a fuel cap to prevent spillage and to also prevent the escape of fuel vapors which are flammable and therefore potentially dangerous.

A typical fuel cap comprises a circular head portion, from which extends a cylindrical threaded member. The cylindrical threaded member engages with corresponding threads within the fuel tank filling pipe at the end thereof so that the fuel cap can be securely tightened. Rubber or other seals or gaskets may be provided to ensure an airtight seal between the fuel cap and the end of the filling pipe.

In conventional fuel caps, the head portion has a somewhat flat upper surface. In order to make it easier for the user to remove and replace the fuel cap, the head portion may include ridges or projections on the outer periphery to facilitate engagement and a firm grip. Alternatively, or in addition, the fuel cap may have on its somewhat flat surface a ridge which can be twisted so as to turn the fuel cap in a clockwise or counter-clockwise direction, as needed.

A problem with many existing fuel caps relates to the difficulty in removing and replacing the fuel cap when refueling the vehicle. A firm connection between the fuel cap and the end of the filling pipe is essential, but this often makes it difficult to remove the fuel cap, especially where the nature of access to the fuel cap may be limited by the size of the compartment or recess. Further, some operators may, due to age or other circumstances, not be strong enough to provide the necessary torque to remove the fuel cap from the end of the filling pipe.

In one aspect, the present invention therefore relates to an accessory which can be attached to existing fuel caps in order to make it easier to remove and/or replace the fuel cap during fueling of the vehicle.

The prior art shows tools and accessories in somewhat related areas. For example, U.S. Pat. No. 4,846,025 (Keller) shows a radiator cap tool for removing radiator caps. The tool has a hollow handle and a flanged hollow face with a recess. Opposed rectangular indentations at the perimeter of the recess facilitate the removal only of a radiator cap.

U.S. Pat. No. 5,699,701 (Cotten) describes a tool for removing a vehicle fuel tank cap. The tool has a cradle for engaging the lug on a conventional fuel tank cap. A handle is pivotally connected as part of the tool, and is pivotable between a stored position and various angular positions to facilitate turning of the fuel cap and to accommodate the strength of a particular user. This tool is claimed to be useful for the elderly and physically handicapped. The tool is, however, somewhat cumbersome, and the fuel door cannot be closed until the tool has been removed.

U.S. Pat. No. 5,896,785 (Shaw) also shows an automobile fuel cap removal tool having a bell shape with channels formed by wall segments on the inside of the bell. A shaft extends from the top of the bell to a handle. However, the handle exceeds the width of the fuel cap and, as with some of the previous prior art mentioned above, the fuel door will not close with the tool in place.

SUMMARY OF THE INVENTION

In one aspect, the present invention is for a fuel cap extension which is an adaptor or an accessory for a motor vehicle fuel cap which makes it easier for individuals to remove and replace the fuel cap tightly, even where access thereto is somewhat limited, or the operator may find it difficult due to age or weakness to operate the fuel cap.

A particular advantage of one embodiment of the invention is the fact that the fuel cap extension can be relatively permanently, although releasably, fixed to the fuel cap. Thus, the fuel cap extension is able to attach to the fuel cap such that it can remain there permanently, enabling removal and re-attachment thereof, and also enabling the fuel door to be opened and closed without obstruction.

An advantage of the present invention is its ability to attach to existing fuel caps to provide leverage for the application of additional torque. The invention provides improved gripping means, and a longer horizontal finger protrusion on the top of the fuel cap to facilitate this greater leverage. Since the invention effectively enlarges slightly and lengthens the finger protrusion already on the fuel cap, in the vast majority of cases, the fuel cap extension of the invention can simply remain on the fuel cap at all times, even during non-fueling and when the fuel door is closed.

The fuel cap extension of the invention may be snap-fitted or otherwise attached to the existing fuel cap. In another embodiment, the fuel cap extension can be located on the fuel cap so as to be pivotable thereon in a direction away from the fuel cap, and return to its closed position when not in use.

According to one aspect of the invention, there is provided a gas cap extension for use on a motor vehicle gas cap, the gas cap extension comprising: an elongate base member dimensioned so as to extend substantially diametrically across the gas cap, the base member having upper and lower surfaces and a pair of side edges; a pair depending side walls extending from the side edges of the base member, the side walls and base member defining a channel for receiving a portion of the gas cap; and securing means on the gas cap extension whereby the gas cap extension can be secured to a gas cap.

BRIEF DESCRIPTION OF THE DRAWINGS

FIG. 5 is an end view of the fuel cap extension shown in FIG. 3;

FIG. 6 is a perspective view showing the fuel cap extension of the invention mounted on an existing fuel cap;

FIG. 7 is a side view of another embodiment of a fuel cap extension of the invention; and FIG. 8 is a side view of yet a further embodiment of a fuel cap extension of the invention.

DETAILED DESCRIPTION OF THE PREFERRED EMBODIMENTS

Reference is now made to the accompanying drawings which show fuel caps, and the various types of fuel cap extensions which may be provided therefore in accordance with the present invention.

Figure 1:
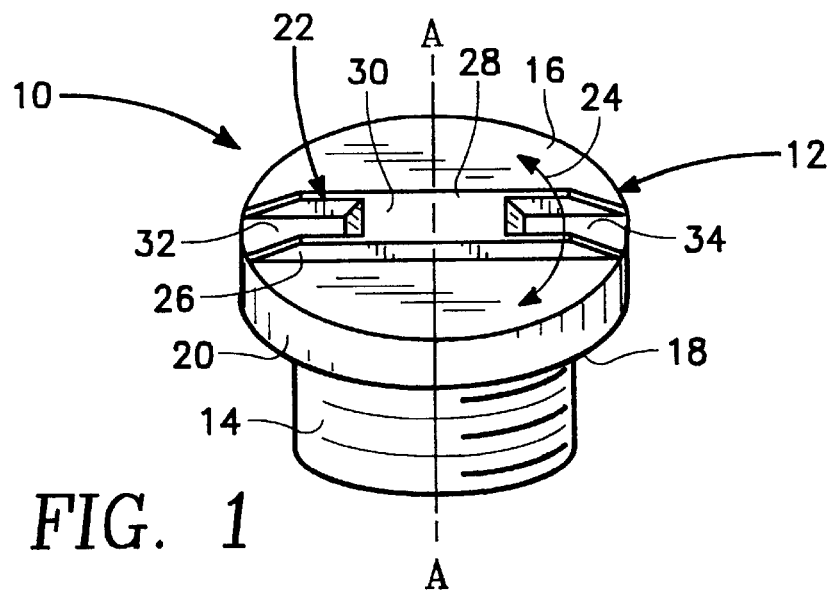
FIG. 1 is a perspective view of a fuel cap, which forms part of the prior art.
Figure 2:
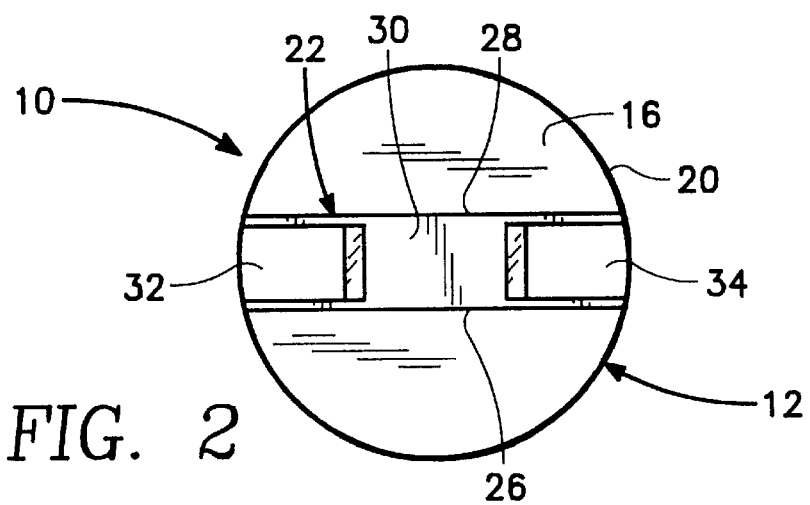
FIG. 2 is a top view of the fuel cap shown in FIG. 1.

In FIG. 1 of the drawings, there is shown a fuel cap 10, which is of the typical shape and configuration of fuel caps presently used in motor vehicles. The fuel cap 10 comprises a head portion 12 and, depending therefrom, a cylindrically-shaped attachment portion 14. The head portion 12 is generally of circular shape, having an upper surface 16 and a lower or under surface 18. The head portion 12 has a peripheral side edge 20, of some thickness, extending between the upper and lower surfaces 16 and 18 respectively.

On the upper surface 16 of the head portion 12, there is provided a handle 22 which is integral with, and extends upwardly from, the head portion 12. The handle 22 provides a protrusion on the upper surface 16 which enables the user to twist the fuel cap in clockwise and counter-clockwise rotation, indicated by reference numeral 24, about the axis A—A of the fuel cap 10. The handle 22 comprises a pair of parallel side walls 26 and 28, a top end 30, and a pair of inclined side edges 32 and 34.

In use, the fuel cap 10 is removed from and replaced on the fuel tank filling pipe by grasping or sandwiching the handle 22 between thumb and index finger and twisting. Since the handle 22 is relatively short, and somewhat centrally located, the extent of leverage is reduced, and, in some cases, a substantial torque force must be exerted in order to loosen or tighten the fuel cap 10.

Figure 3:
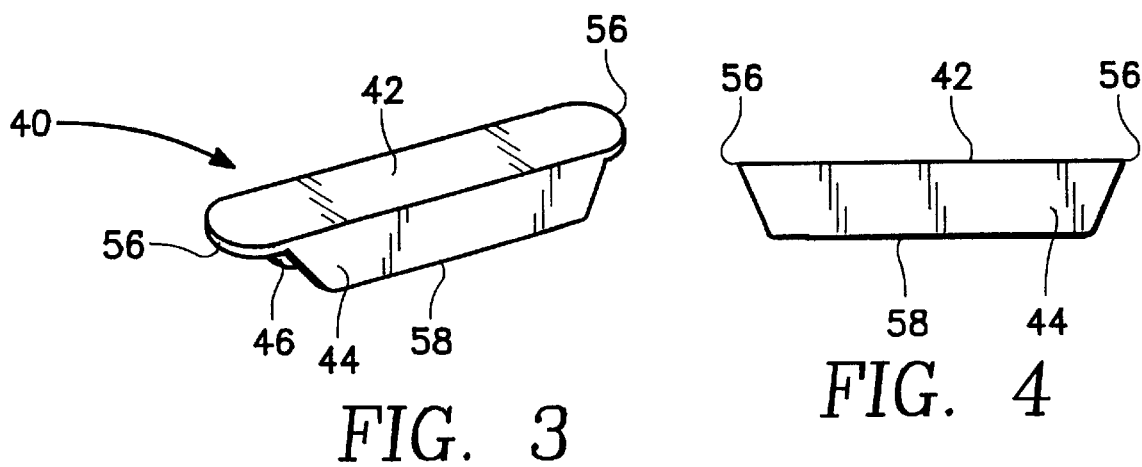
FIG. 3 is a perspective view of one embodiment of the fuel cap extension of the invention.
Figure 4:
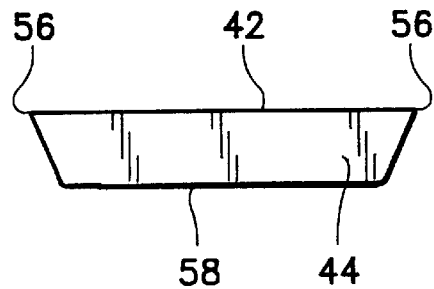
FIG. 4 is side view of the fuel cap extension of the invention shown in FIG. 1.

FIG. 3 shows a perspective view of one embodiment of the fuel cap extension of the invention. The fuel cap extension 40 is a hollow, slightly wedge-shaped and elongate member which is adapted to fit over the handle 22, and remain thereon either by the use of adhesive, or by shaping the fuel extension 40 so that it snaps onto, and is retained by, the handle 22.

The fuel cap extension 40 comprises a U-shaped member including an upper wall 42 and two depending side walls 44 and 46 extending downwardly from the edges of the upper wall 42. The upper wall 42, and side walls 44 and 46, define a channel 48, formed by the inner surfaces 50 and 52 of each of the side walls 44 and 46, respectively, and by the inside surface 54 of the upper wall 42.

Each end 56 of the upper wall 42 has a rounded or arcuate surface or contour, so as to be smooth. There are no sharp or square ends which may cause discomfort to the user when removing or replacing the fuel cap. Furthermore, each of the side walls 44 and 46 is tapered so that the distance between the side walls 44 and 46 is narrower near its lower edge 58 than near its upper edge 60. This may best be seen in FIG. 5 which shows a side view of the fuel cap extension 40.

In a preferred embodiment of the invention, the side walls 44 and 46 are not parallel to each other, but taper slightly so that the open end 62 of the channel 48 is slightly narrower than the closed end 64 of the channel. The fuel cap extension 40 is also comprised of a material, such as a hard plastic, aluminum, metal or other suitable material which is somewhat resilient in nature. Therefore, the lower edges 58 of each side wall 44 and 46 can, upon the application of pressure, be forced apart to some extent, but will resume their original positions when the force is released. This is an important attribute of the fuel cap extension 40 since it enables, as described below, the fuel cap extension 40 to snap onto an existing handle 22.

In one embodiment, an adhesive strip 66 is provided on the inside surface 54 of the upper portion 42. The adhesive strip 66 has both of its surfaces coated with an adhesive material so that it adheres to the inside surface 54, and will also adhere to the, for example, top edge 30 on a handle 22.

In use, the fuel cap extension 40 is located over a handle 22 of a fuel cap 10. FIG. 6 is a perspective view, showing the fuel cap extension 40 superimposed over the handle 22 of a fuel cap 10 shown in FIG. 1 of the drawings. Importantly, it will be noted that the effect of the fuel cap extension 40, seen in FIG. 6, is to increase substantially the leverage available so that less force is required to rotate the fuel cap. In the original fuel cap, the length of the handle 22 is represented by the line X—X. When the fuel cap extension 40 is placed on the handle 22, the area of leverage is substantially increased, and can be almost doubled or more, to the distance represented by the line Y—Y. Since opposing forces on each side wall 44 and 46 respectively of the fuel cap extension 40 can be applied at an increased distance from each other, this additional leverage makes it considerably easier for the user or operator to remove or replace the fuel cap. In order to evenly distribute this turning torque, the extension 40 is centrally mounted on the fuel cap 10 with axis A—A passing through the mid-point of the extension 40 as shown in FIG. 6.

The fuel cap extension 40 snaps on over the handle 22. The open end 62 of the channel 48 is the same as, or of slightly smaller, length than the width of the handle 22. The resilience of the side walls 44 and 46 permit them to be slightly separated from each other under force, thus permitting the fuel cap extension to be forced over the handle 22 so that side wall 44 of the fuel cap extension slides down side wall 26 of the handle 22, and side wall 46 of the fuel cap extension 40 slides down the side wall 28 of the handle 22. Since the distance at the open end 62 is preferably slightly less than the width of the handle 22, the lower edges 58 of side walls 44 and 46, when installed on the handle 22, will provide a continuing inward force tending to hold the fuel cap extension 40 firmly on the handle 22. It will be noted that the force necessary to open and close the fuel cap is a rotational one. Normal use of the fuel cap extension 40 will not generally interfere with its attachment to the handle 22. Removal of the fuel cap extension 40 is achieved by pulling it away from the upper surface 16 of the fuel cap 10, which is, of course, a different force direction to the rotational one needed for the operation of the fuel cap 10.

To provide additional adhesion between the fuel cap extension 40 and the handle 22, the adhesive strip 66 can be used.

Rotation in a clockwise and counter-clockwise direction of the fuel cap 10 results in the cylindrical attachment portion 14 engaging the fuel filling pipe, not shown in the drawings. Typically, the cylindrical attachment portion 14 may include outer threads which theadedly engage the fuel filling pipe. In normal operation, the rotation of the fuel cap 10 in a clockwise direction will tend to tighten the fuel cap 10 and seal it with respect to the fuel filling pipe, while counter-clockwise rotation permits the fuel cap 10 to be removed.

FIG. 7 of the drawings shows another embodiment of the invention. In FIG. 7, a fuel cap extension 70 is shown attached to a fuel cap 72. The fuel cap 72 includes a head portion 74 having an upper surface 76, on which is located a handle 78, which may be similar to, or the same as, the handle shown in FIG. 1 of the drawings. The fuel cap extension 70 is attached to the handle 78 by a pivot pin 80, which allows the fuel cap extension 70 to move between a closed position, where the lower edges 82 of the fuel cap extension 70 rest on, or are very close to, the upper surface 76. The fuel cap extension may be pivoted about the pivot pin 80 to varying open positions, one of which is shown in FIG. 7 of the drawings. In use, the fuel cap extension 70 can be pivoted upwardly and away from the upper surface 76, providing an outwardly extending handle, with increased leverage, in order to open the fuel cap 72. When not in use, the fuel cap extension 70 is simply pushed down, and does not otherwise interfere with the fuel door which is still able to close.

The embodiment shown in FIG. 7 may be particularly useful where the fuel cap 72 may be located fairly deeply in the recessed compartment of the vehicle, making it difficult to fully access and grip the handle 78. The pivotable fuel cap extension 70 thus permits turning of the fuel cap 72 from a position which is, to an extent, removed from the fuel cap 72 itself, and in a more convenient location for a proper grip.

In FIG. 8 of the drawings, another embodiment of the invention is shown. FIG. 8 shows a fuel cap extension 88, and, in phantom lines, the handle 90 of a fuel cap 10. As described in the previous embodiments, the fuel cap extension 88 installs over the handle 90 to provide additional and improved access and leverage to rotate the fuel cap. The embodiment shown in FIG. 8 comprises a fuel cap extension 88 having an upper gripping section 92, and depending clamp members 94 and 96 respectively. Each clamp member 94 and 96 includes a leg 98 and flange 100 by means of which the fuel cap extension 88 can be attached to the handle 90 or other part of the fuel cap.

The upper gripping section 92 comprises a flat central portion 102, and two end protuberances 104 and 106. The fuel cap extension 88 is designed so as to guide the user's hand and fingers so as to apply opposing forces on end protuberances 104 and 106 respectively, thus facilitating easy opening and closing of the fuel cap. Clearly, applying the opposing forces at the ends of the fuel cap extension 88 (and near the protuberances 104 and 106) would make it easier to remove and replace the fuel cap as compared to holding the fuel cap extension in the central portion. The structure of the fuel cap extension shown in FIG. 8 encourages such use.

The fuel cap extension of the invention can be easily retro-fitted and applied to original fuel caps provided with vehicles. Further, the structure and shape of the fuel cap extension can be adapted to accommodate the different types of fuel caps provided by the vehicle manufacturers.

Moreover, the invention can, if desired, be easily removed, or snapped into and out of position on the handle.

While the fuel cap extension is designed so as to remain, at all times, on the fuel cap, even when the fuel door is closed, it can nevertheless be removed if desired.

The fuel cap extension may also telescope to give it additional length, thus increasing the leverage provided. Telescoping makes the fuel cap extension longer during use, and it can thereafter be compacted so as to fit over the gas cap when not in use. In another form, the fuel cap extension may be capable of sliding along the handle of the fuel cap. Once more, this has the effect of lengthening the leverage during use, but restoring the components to a size that can easily be accommodated in the recess or compartment when not is use.

The invention is not limited to the precise details as described above, but the structure and components may vary in dimension, materials used for the construction thereof, as well as general configuration, within the scope of the claims. Furthermore, the upper surface or other portion of the fuel cap extension may provide a space for advertising, instructions, or the display of other material.

What is claimed is:

1. An extension for use on a fuel cap, the extension comprising:

an elongate base member dimensioned so as to extend substantially diametrically across the cap, said base member being centrally mounted on said fuel cap, the base member having upper and lower surfaces and a pair of side edges; and a pair of depending side walls extending from the side edges of the base member, the side walls and base member defining a channel with an open end for receiving a portion of the cap by insertion through said open end, said side walls being tapered relative to each other so said open end is narrower than the distance between said side walls at said elongate base member, when said portion is inserted through said open end said side walls are deflected and spread apart at said open end producing a resilient force pressing said side walls in contact with said portion.

2. An extension as claimed in claim 1 further comprising an means for adhesively securing said extension to said fuel cap.

3. An extension as claimed in claim 1 wherein the side walls have pivot members for pivotal connection to the cap to enable the extension to move between a closed position and an open position where the extension is pivoted away from the cap.

4. An extension as claimed in claim 1 wherein the base member comprises a rounded protrusion near each end thereof, the rounded protrusions being used to grip the cap extension.

* * * * *